United States Patent
Campbell et al.

(10) Patent No.: US 7,789,116 B2
(45) Date of Patent: Sep. 7, 2010

(54) WHEEL UNIT

(75) Inventors: Peter Ian Campbell, West Midlands (GB); Anthony Mitchell Glazebrook, Leicestershire (GB); Alan Burdett, Leicestershire (GB)

(73) Assignee: Tyron Developments Limited, Leicestershire (GB)

( * ) Notice: Subject to any disclaimer, the term of this patent is extended or adjusted under 35 U.S.C. 154(b) by 1127 days.

(21) Appl. No.: 10/543,938

(22) PCT Filed: Feb. 4, 2004

(86) PCT No.: PCT/GB2004/000428

§ 371 (c)(1),
(2), (4) Date: Jun. 5, 2006

(87) PCT Pub. No.: WO2004/069564

PCT Pub. Date: Aug. 19, 2004

(65) Prior Publication Data

US 2007/0034308 A1 Feb. 15, 2007

(30) Foreign Application Priority Data

Feb. 4, 2003 (GB) .................... 0302515.2

(51) Int. Cl.
*B60C 17/00* (2006.01)
*B60C 25/00* (2006.01)
(52) U.S. Cl. ............. 152/152; 152/155; 152/450; 152/516; 157/1.1
(58) Field of Classification Search ............ 152/155, 152/156, 157, 158, 516, 517, 518, 519, 520, 152/152; 157/1.1
See application file for complete search history.

(56) References Cited

U.S. PATENT DOCUMENTS

| 2,775,282 | A |   | 12/1956 | Kennedy |   |
|---|---|---|---|---|---|
| 3,828,836 | A |   | 8/1974 | Bradley |   |
| 3,948,305 | A |   | 4/1976 | Watts |   |
| 4,164,250 | A | * | 8/1979 | Shichman | 152/205 |
| 5,660,653 | A | * | 8/1997 | Gardetto | 152/520 |
| 2001/0052379 | A1 |   | 12/2001 | Heuze et al. |   |

FOREIGN PATENT DOCUMENTS

| DE | 2553449    | * | 6/1997  |
|----|------------|---|---------|
| FR | 2 637 846  |   | 4/1990  |
| GB | 2 032 856  |   | 5/1980  |
| GB | 2 204 841  |   | 11/1988 |
| JP | 2000-52708 | * | 2/2000  |

* cited by examiner

*Primary Examiner*—Justin Fischer
(74) *Attorney, Agent, or Firm*—Renner, Otto, Boisselle & Sklar, LLP (57) ABSTRACT

A wheel unit (10) comprises a wheel rim (12), a pneumatic tyre (14) receivable on the wheel rim (12) and a runflat assembly (16) adapted to be seated on the wheel rim (12) to close off a well (22) provided in the wheel rim (12). The runflat assembly (16) includes an annular support body (24) which is radially expandable to an expanded condition and contraction means (28,30) adapted to be operated via an opening (78) formed in the wheel rim (12). The contraction means (28, 30), when activated, is operable on the support body (24) to cause the support body (24) to be contracted to a radially contracted condition. The contraction mean is accessible through the opening (78) to cause the support body (24) to be radially contracted to seat the runflat assembly (16) on the wheel rim (12) to close off the well (22). The support body (24), when in its contracted condition, has a diameter greater than that of the wheel rim (12).

14 Claims, 6 Drawing Sheets

WHEEL UNIT

This application is a national phase of International Application No. PCT/GB2004/000428 filed Feb. 4, 2004 and published in the English language.

The invention relates to a wheel unit including a wheel rim, a pneumatic tyre and a runflat assembly.

A vehicle wheel normally comprises a pneumatic tyre supported upon a wheel rim. The wheel rim usually includes a pair of axially spaced annular flanges against which the beads of the tyre are sealingly seated, in use.

In between the pair of annular flanges of a one-piece wheel the wheel rim usually includes a well that, during fitting and removal of the tyre, receives the beads of the tyre to enable the tyre to be passed over one of the annular flanges.

In the event of a puncture while a wheel is rotating on a vehicle (herein referred to as a "runflat operation") it is possible for the tyre, if sufficiently deflated, to come off the wheel rim as a result of the tyre beads entering the well. If this happens, steerage control of the wheel, and thus the vehicle, may be lost.

It is known to provide runflat assemblies that, during fitment of a tyre on a wheel rim, is fitted to block off the well and thereby prevent the beads of the tyre entering the well.

However, during installation of known runflat assemblies, the beads of the tyre must be located on one side of the well to provide access to the well and allow installation of the runflat assembly. The beads are then arranged on opposite sides of the well after installation of the runflat assembly, thereby permitting inflation of the tyre.

According to an aspect of the invention there is provided a wheel unit comprising a wheel rim, a pneumatic tyre receivable on the wheel rim and a runflat assembly adapted to be seated on the wheel rim to close off a well provided in the wheel rim, the runflat assembly including an annular support body which is radially expandable to an expanded condition, the runflat assembly including contraction means adapted to be operated via an opening formed in the wheel rim, the contraction means when activated being operable on the support body to cause the support body to be contracted to a radially contracted condition, the support body when in its expanded condition being located within the tyre during fitment of the pneumatic tyre on the wheel rim, and on completion of fitment of the tyre said contraction means being accessible through said opening to permit the contraction means to be operated to cause the support body to be radially contracted to seat the runflat assembly on the wheel rim to close off the well, the support body, when in its contracted condition, having a diameter greater than that of the wheel rim.

The provision of a runflat assembly having an expandable annular support body permits the runflat assembly to be fitted on a wheel rim from within the tyre. This is because it permits the circumferential size of the support body to be expanded to a size which is large enough to permit location of the assembly within the tyre to be internally spaced from the beads of the tyre prior to fitting the tyre on the wheel rim, and thereby enables the support body to be passed over the wheel rim whilst within the tyre. Provision of contraction means which are adapted to be operated through an opening in the wheel rim enables the beads of the tyre to be seated on the rim prior to operation of the contraction means. This considerably simplifies fitment of the runflat assembly.

The annular support body is preferably formed from separate circumferentially extending segments held together by the contraction means.

The contraction means may include an annular band which is radially contractible to a contracted condition and operably associated with the support body to cause contraction of the support body on contraction of the annular band. The annular band is preferably split at at least one circumferential location to define opposed ends, the runflat assembly preferably further including connector means operably associated with the annular band for adjustably connecting the opposed ends together to permit expansion and contraction of the support band.

In a preferred embodiment of the invention, the connector means includes a worm gear which is rotatably mounted on one of the opposed ends of the annular band and is engageable with rack teeth provided on the other end of the annular band. In such embodiments, the connector means is operable to expand or contract the annular band on rotation of the gear. This is advantageous as it enables a shaft implement, such as a screwdriver or driven shaft to be inserted through the opening in the rim to engage and rotationally drive the gear.

Alternatively, the contraction means may further include an actuator in the form of a shaft having a slot through which the band passes; contraction/expansion of the band being effected by rotation of the shaft to cause the band to be wound or unwound about the shaft.

Preferably a ratchet gear is mounted on the shaft which is engageable with a pawl to thereby prevent rotation of the shaft in the direction which causes unwinding of the band and so prevents expansion of the annular band until the pawl is released.

Preferably, in such embodiments, the connector means further includes a release lever to disengage the pawl and permit expansion of the annular band.

Preferably accessible, said opening in the rim is constituted by the valve opening provided in the wheel rim in which a pneumatic valve for inflating the tyre is normally seated.

To enhance the fit of the runflat assembly on the wheel rim, the runflat assembly may include a liner, which is located internally of the annular support body, the cross-section of the liner preferably corresponding in size and shape to the cross-section of the well provided in the wheel rim. Preferably the liner is detachably connected to the annular support body to enable liners of different shapes/sizes to be attached.

Preferably the annular support body is formed of a relatively rigid material and has an outer circumferential face which projects radially beyond the annular flange of the wheel rim.

In a particularly preferred embodiment, the sectional support body may have axially projecting formations engageable with opposed beads of the pneumatic tyre in order to hold the opposed beads in abutment with adjacent annular flanges of the wheel rim.

The runflat assembly may include an outer annular support band which is rotatably mounted on the annular support body, preferably by a series of roller bearings located therebetween.

Thus, in use, when a tyre is deflated, the inner wall of the tyre is sandwiched between the ground and the annular band whilst the wheel is rotating. The provision of an outer annular support band, which is movable relative to the support body, enables a deflated tyre to rotate relative to the wheel in a runflat operation, thereby reducing friction between the tyre and the runflat assembly. This reduces the risk of the tyre splitting during a runflat operation, and enables the wheel, in a runflat condition, to travel a significant distance, e.g. 50 km.

According to another aspect of the invention there is provided a method of fitting the pneumatic tyre and the runflat assembly on to the wheel rim of the wheel unit as defined above including the steps of:

(i) expanding the annular support body and locating the annular support body within the pneumatic tyre;

(ii) fitting the pneumatic tyre with the annular support body located therein on to the wheel rim; and (iii) contracting the annular support band to seat the runflat assembly on the wheel rim by operating the contracting means via the opening in the wheel rim.

Preferably, step (ii) further includes the sub-steps of:

(a) rotating the pneumatic tyre about the wheel rim until the annular support body is oriented in a predetermined rotational position relative to the wheel rim so that the contracting means is aligned with said opening;

(b) inflating the pneumatic tyre to cause the beads of the tyre to seat on the wheel rim; and (c) deflating the pneumatic tyre.

Preferred embodiments of the invention will now be described, by way of non-limiting examples, with reference to the accompanying drawings in which.

A wheel unit 10 according to an embodiment of the invention is shown in FIGS. 1-7.

The wheel unit 10 includes a wheel rim 12 and a pneumatic tyre 14, which is receivable on the wheel rim 12. The wheel unit 10 also includes a runflat assembly 16 adapted to be seated on the wheel rim 12, preferably on opposed sides 18,20 of a well 22 formed in the wheel rim 12.

Figure 8:
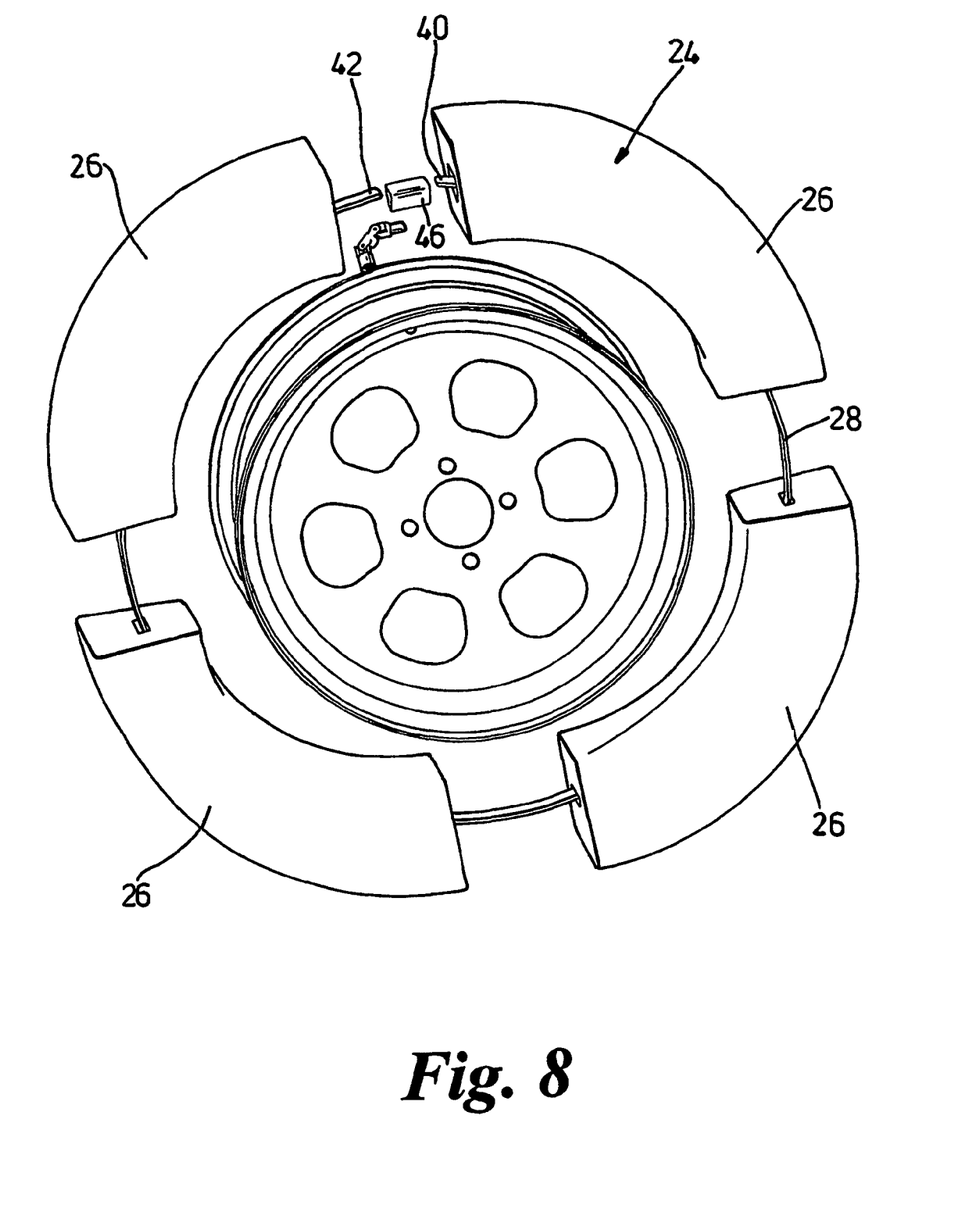
FIG. 8 is a schematic perspective view of a wheel unit according to a further embodiment of the invention showing the support body in an expanded condition.

The runflat assembly 16 includes an annular support body 24, which is preferably formed of a rigid material. The support body 24 preferably includes a plurality of circumferentially extending segments 26, as shown in FIG. 8. Each of the segments 26 preferably comprises a two-part moulding of a suitable plastics material.

The support body 24 preferably includes four circumferentially extending segments 26. The provision of these segments 26 enables the support body 24 to be radially expanded/ contracted. Radial expansion and contraction of the support body 24 is preferably achieved using an annular band 28 housed within the support body 24. The band 28 is preferably formed of a flexible strip of non-extensible tensile material, such as steel.

In the embodiment shown in FIGS. 1-7, contraction of the band 28 is achieved using an actuator 30, which includes a rotatable shaft 32 having a slot 34 passing therethrough. As shown schematically in FIG. 5, the band 28 is fed through the slot 34 and, on rotation of the shaft 32, the band 28 is wound or unwound about the shaft 32 causing contraction or expansion of the band 28 respectively.

To restrict rotation of the shaft 32 to one direction only, the actuator 30 preferably includes a ratchet gear 36 mounted on the shaft 32 for engagement with a pawl 38 (FIG. 6) pivotally mounted in the actuator 30 relative to the ratchet gear 36.

In the embodiment shown in FIGS. 1-7, engagement between the ratchet gear 36 and the pawl 38 restricts rotation of the shaft 32 so that the shaft 32 can only be rotated to wind the band 28 about the shaft 32, and thereby cause contraction of the band 28.

The actuator 30 also preferably includes a ratchet release lever (not shown). On actuation of the release lever, the pawl 38 is disengaged from the ratchet gear 36 permitting expansion of the band 28.

In this embodiment, the band 28 may be split at at least one location to define opposed ends, the actuator 30 acting as a connector to connect the opposed ends as well as facilitate expansion/contraction of the band 28.

Figure 9:
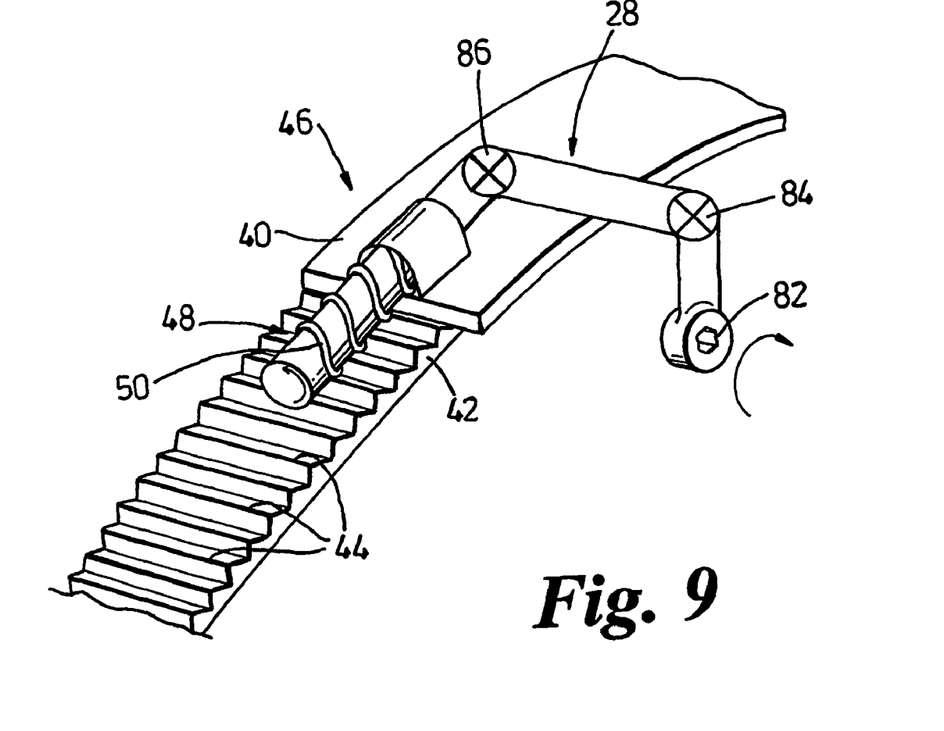
FIG. 9 is a schematic view of a connector of the runflat assembly of the wheel unit of FIG. 8.
Figure 10:
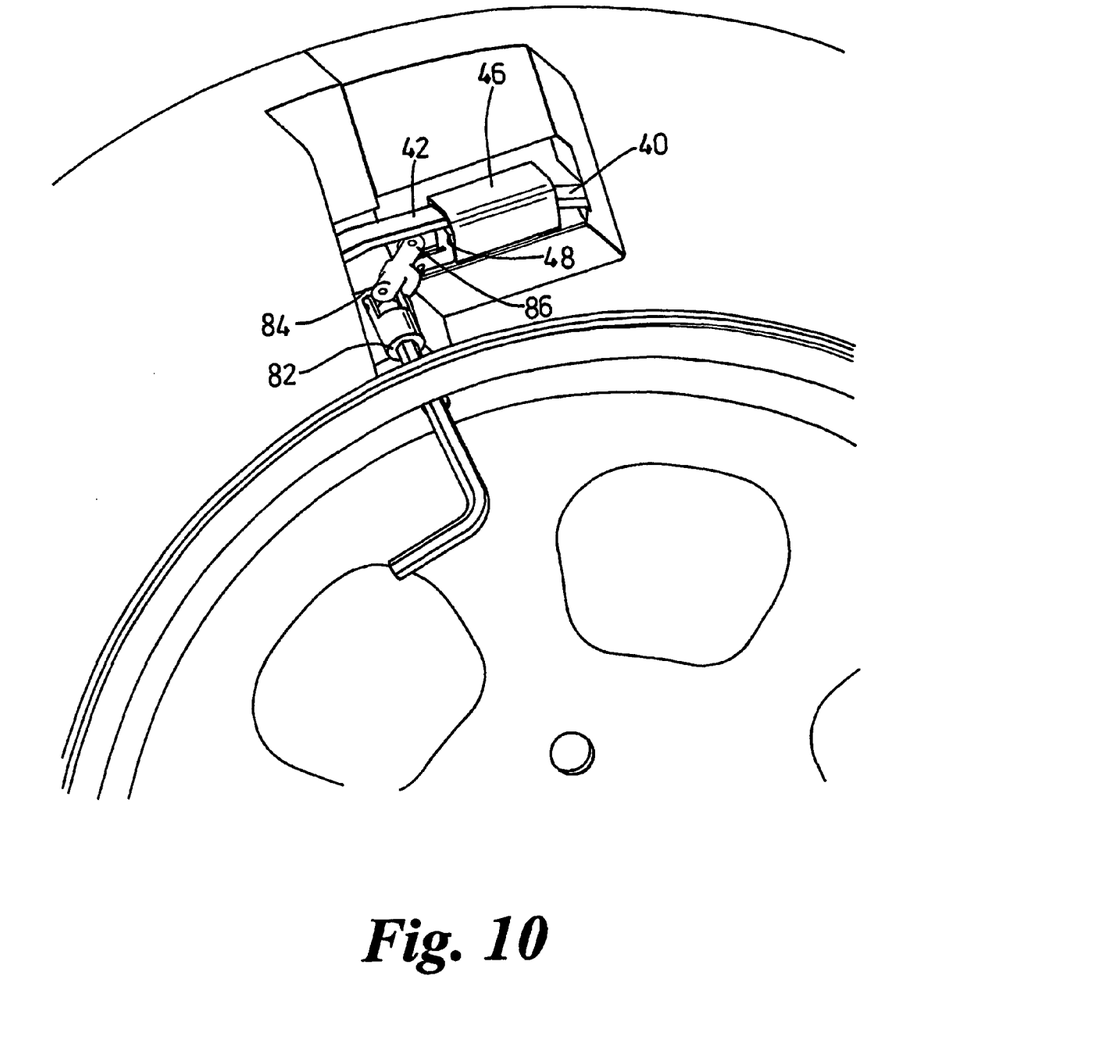
FIG. 10 is a schematic part perspective view of the wheel unit of FIG. 8 shown in its contracted condition.

In another embodiment, the annular band 28 may be split at at least one circumferential location to define opposed ends 40,42, as shown in FIGS. 8-10.

In this embodiment, the band 28 is preferably formed on one surface with a plurality of equidistantly spaced rack teeth 44 (FIG. 9) extending widthwise thereof.

A connector 46 preferably connects the opposed ends 40,42 together. The connector 46 is fixed to one end 40 of the band 28 and includes a worm gear 48 (FIG. 9). The worm gear 48 has a helical thread 50 engageable with the rack teeth 44 on the other end 42 of the band 28.

The separation of adjacent rack teeth 44 formed in the band 28, and the size of the helical thread 50 formed on the worm gear 48, is preferably chosen such that, on rotation of the worm gear 48, engagement of the helical thread 50 with the rack teeth 44 on the band 28 causes movement of the one end 40 of the band 28 relative to the other end 42 of the band 28. It thereby controls the diametrical size of the annulus defined by the band 28.

In the embodiment shown in FIGS. 1-7, the runflat assembly 16 preferably includes a liner 52 on an inner surface 54 of the support body 24. The liner 52 is preferably formed in sections, each section being mounted on a corresponding segment 26 of the support body 24.

The liner 52 is preferably formed such that the shape and size of its cross-section corresponds to the shape and size of the cross-section of the well 22 formed in the wheel rim 12.

On an outer surface 56 of the support body 24, the runflat assembly 16 preferably includes an annular support band in the form of a roller 58.

As with the liner 52, the roller 58 is preferably formed in sections, each section being mounted on a corresponding segment 26 of the support body 24.

In other embodiments, the roller 58 may be omitted.

The or each section of the roller 58 preferably includes grooves 60 in its undersurface in which a roller bearing is located. The roller bearings allow the or each section of the roller 58 to roll on the support body 24.

The or each section of the roller 58 is preferably slidably mounted on a respective segment 26 of the support body 24 by means of projections 60,62 formed on the section of the roller 58. The projections 60,62 engage within correspondingly formed slots 56,58 formed by projections 64,66 provided on the outer surface 56 of the respective segment 26 of the support body 24.

In the embodiment shown in FIGS. 1-7, the support body 24 is formed with axially extending formations, preferably in the form of teeth 68 projecting outwardly from each side of the support body 24 and extending about the entire circumference of the support body 24.

The purpose of the axially extending formations is to engage the inner walls of the tyre 14, and urge the opposed beads 70,72 of the tyre 14 towards the opposed annular flanges 74 of the wheel rim 12.

In other embodiments, the axially extending formations may be omitted.

Installation of the pneumatic tyre 14 on the wheel rim 12 will now be described with reference to the embodiment shown in FIGS. 1-7.

During installation of the pneumatic tyre 14 on the wheel rim 12, the runflat assembly 16 is located in the pneumatic tyre 14 in an expanded condition.

In the expanded condition of the runflat assembly 16, the band 28 is unwound about the shaft 32 so that the support body 24 is in an expanded condition, i.e. the band 28 is unwound about the shaft 32 so that the diametric dimension of the runflat assembly 16 is large enough to pass over the annular flanges 74 of the wheel rim 12, and so that the runflat assembly 16 does not impede fitment of the pneumatic tyre 14 on the wheel rim 12.

Figure 1:
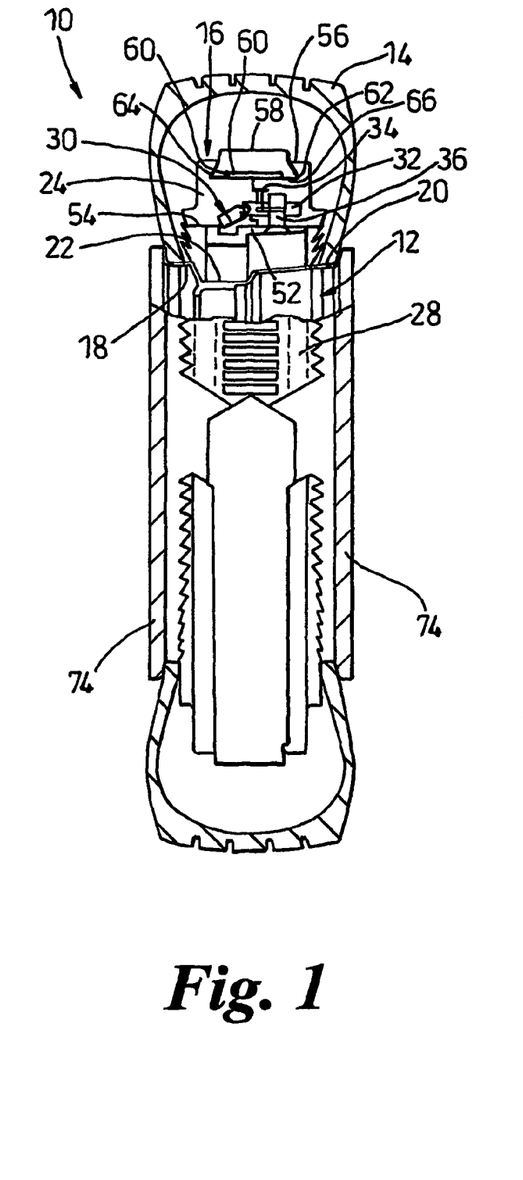
FIGS. 1-4 show a wheel unit according to an embodiment of the invention during fitment of the pneumatic tyre on the wheel rim.
Figures 3, 4:
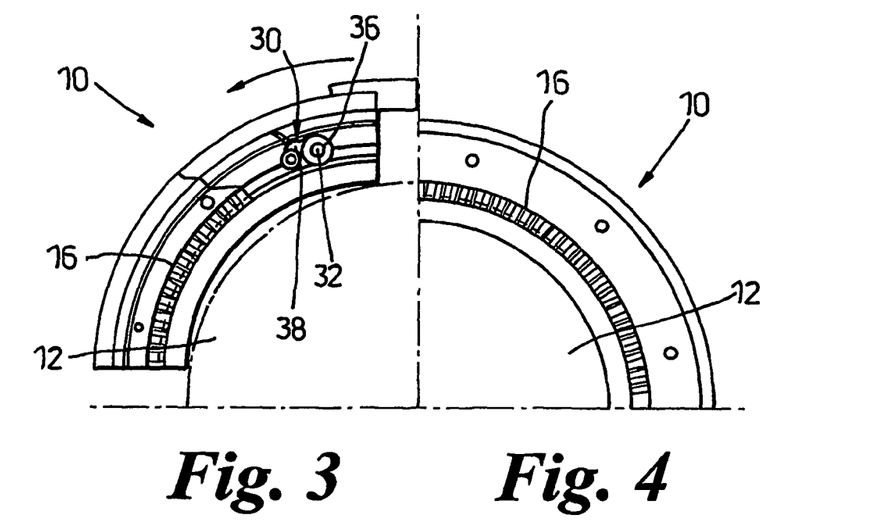
Figure 5:
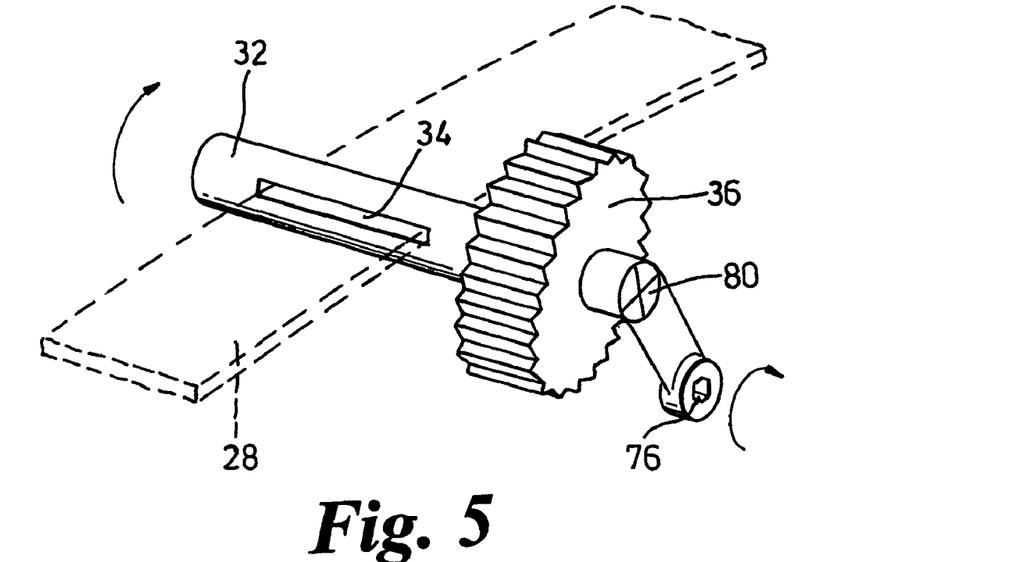
FIG. 5 is a schematic view of an actuator of the runflat assembly of the wheel unit of FIGS. 1-4
Figure 6:
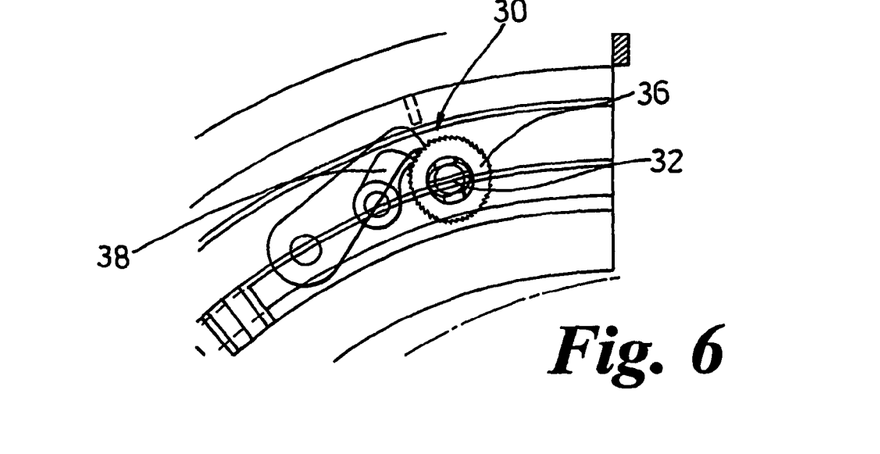
FIG. 6 is a side view of the actuator of FIG. 5.
Figure 7:
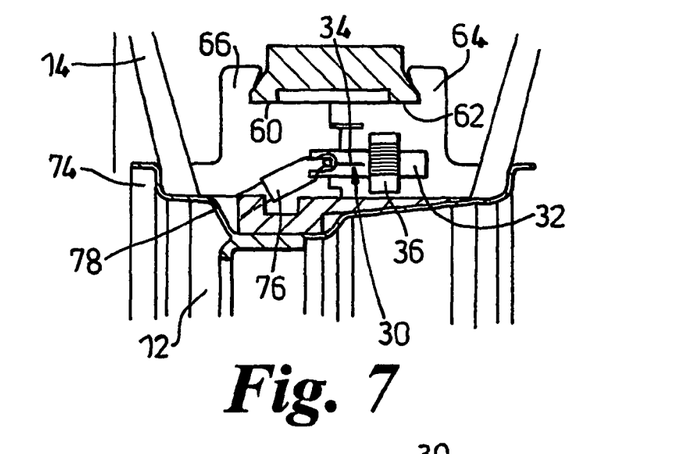
FIG. 7 is a cross-sectional view of the actuator of FIG. 5.

As the pneumatic tyre 14 is fitted on the wheel rim 12, the runflat assembly 16 is retained within the tyre 14, as shown in FIGS. 1 and 3.

Once the tyre 14 is fitted on the wheel rim 12, the tyre 14 and runflat assembly 16 are rotated together about the wheel rim 12 until a socket 76 (FIGS. 5 and 7) on the actuator 30, and a valve opening 78 on the wheel rim 12, are aligned.

A valve (not shown) is then located in the wheel rim 12 and the tyre 14 is partially inflated to urge the tyre beads 70,72 into contact with the opposed annular flanges 74.

Figure 2:
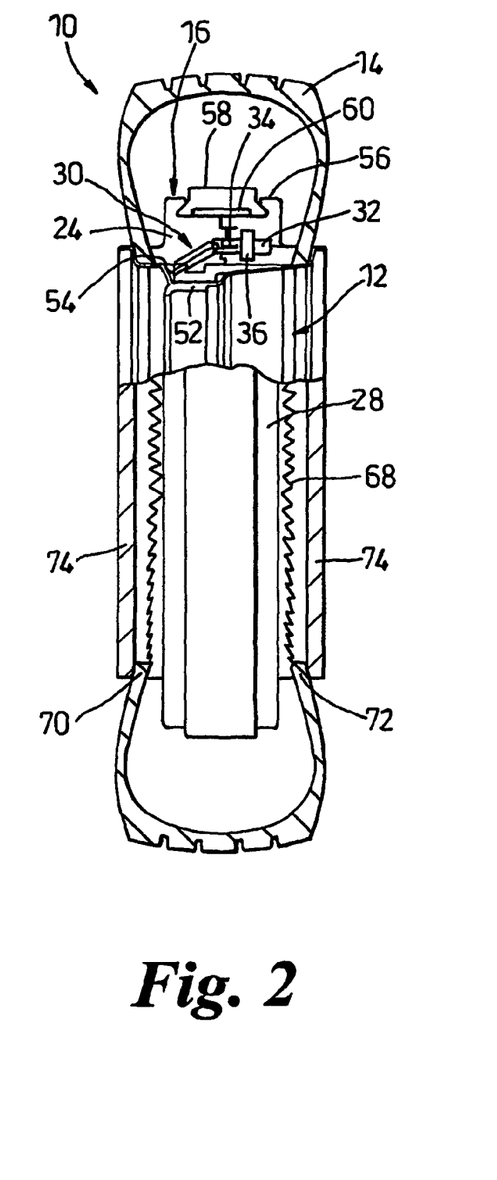

The tyre 14 is then deflated, and the valve is attached to a pulling wire before being pushed back into the tyre 14 to permit access to the socket 76 of the actuator 30. The actuator 30 is then operated via the socket 76 (preferably connected by a universal joint 80 to the shaft 32) to contract the annular band 28, and thereby contract the support body 24 until the runflat assembly 16 is seated on the wheel rim 12, as shown in FIGS. 2 and 4. The socket 76 may be adapted to receive an allen key or another elongate tool such as a screw driver or power driver.

When this has been done, the valve is retrieved by pulling on the pulling wire. Once the valve has been seated in the valve opening 78, the tyre 14 is inflated.

When the support body 24 is seated on the wheel rim 12, the liner 52 is preferably brought into contact with the bottom of the well 22 (as shown in FIG. 2) and the support body 24 is seated on opposed sides of the well 22, thereby blocking the well 22 and preventing the beads 70,72 of the tyre 14 entering the well 22 in a runflat operation. The support body 24 is also preferably prevented from moving axially on the wheel rim 12.

As shown in FIG. 2, the diameter of the support band 24 is greater than the diameter of the wheel rim 12 when the support band 24 is in its contracted state.

During contraction of the runflat assembly 16, the teeth 68 formed on the support body 24 are also brought into contact with the beads 70,72 of the tyre 14, thereby forcing the beads 70,72 against annular flanges 74. This is advantageous when the pneumatic tyre 14 has relatively weak beads 70,72 since it prevents the beads 70,72 from splitting during a runflat condition.

In a runflat operation, when the tyre 14 has deflated, the inner wall of the tyre 14 is sandwiched between the ground and the roller 58. Rolling movement of the roller 58 relative to the support body 24 enables a deflated tyre to rotate relative to the wheel rim 12 in a runflat operation. This reduces friction between the tyre 14 and the runflat assembly 16, which in turn reduces the risk of the tyre 14 splitting during the runflat operation and enables the wheel, in a runflat condition, to travel a significant distance.

Rolling movement of the roller 58 relative to the support body 24 is facilitated by the provision of the roller bearings.

In other embodiments, where the roller 58 is omitted, the differential may be achieved by applying grease to the outer surface 56 of the support body 24.

To permit removal of the runflat assembly 16 from the wheel rim 12 after a runflat operation, the tyre 14 may be cut away until the release lever of the actuator 30 is exposed. The release lever may then be actuated to permit expansion of the band 28.

During installation of a pneumatic tyre 14 on a wheel rim 12 wherein the band 28 of the runflat assembly 16 is split at at least one circumferential location, as that shown in FIGS. 8-10, the helical thread 50 of the worm gear 48 of the connector 46 engages the rack teeth 44 formed on the other end 42 of the band 28 to connect the opposed ends 40,42 of the band 28 together.

As with embodiment shown in FIGS. 1-7, the opposed ends 40,42 of the band 28 are connected so that the diametric dimension of the runflat assembly 16 is large enough to pass over the annular flanges 74 of the wheel rim 12, and so that the runflat assembly 16 does not impede fitment of the pneumatic tyre 14 on the wheel rim 12.

Once the tyre 14 is fitted on the wheel rim 12, the tyre 14 and the runflat assembly 16 are rotated together about the wheel rim 12 until a socket 82 (FIG. 9) on the connector 46, and the valve opening 78 are aligned.

The connector 46 is operated via the socket 82 (preferably connected by two universal joints 84,86 to the worm gear 48) to contract the annular band 28, and thereby contract the support body 24 until the runflat assembly 16 is seated on the wheel rim 12, as shown in FIG. 10.

The socket 82 may be adapted to receive an allen key or another elongate tool such as a screw driver or power driver.

Figure 11:
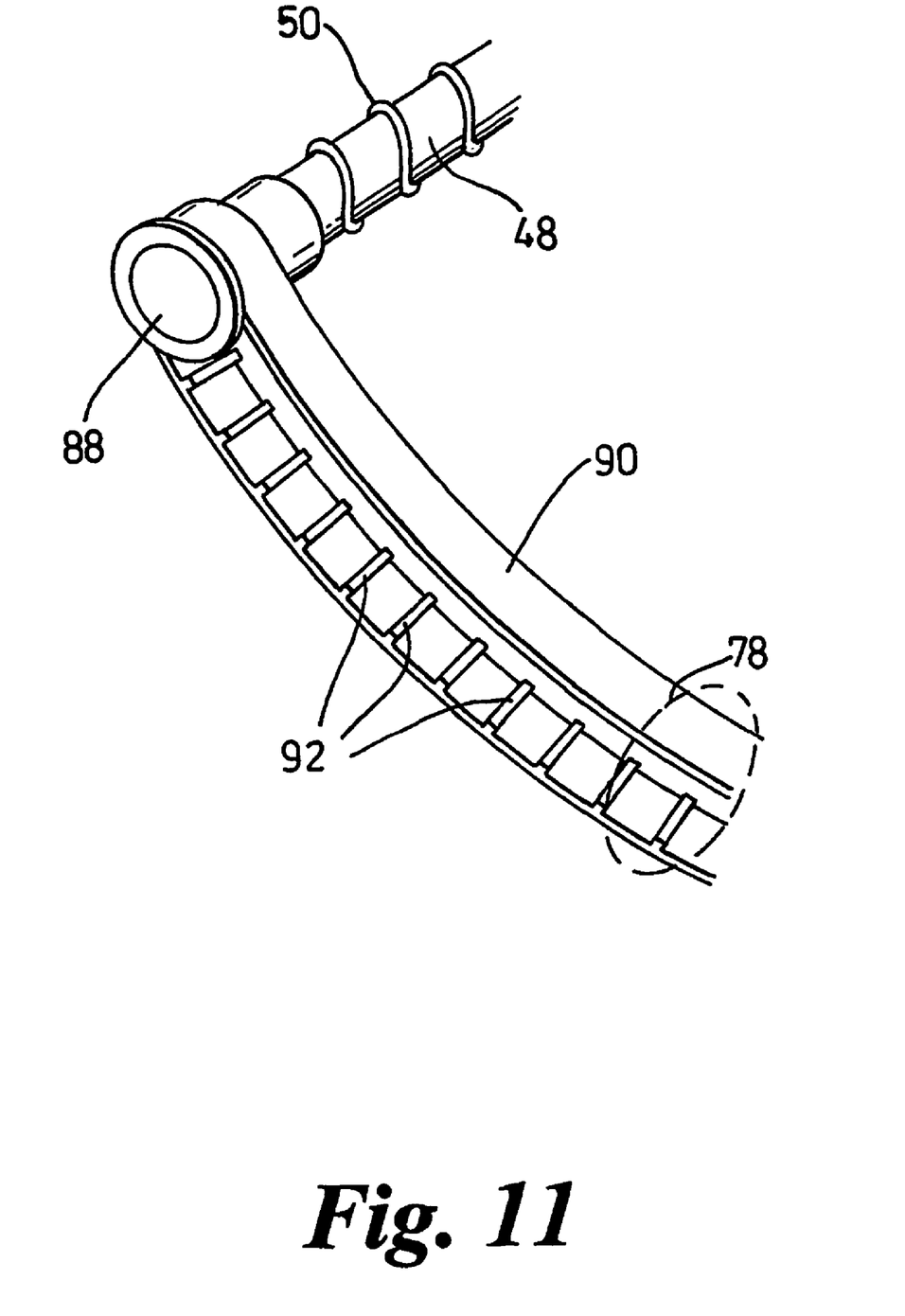
FIG. 11 is a schematic view of a connector of the runflat assembly of a wheel unit according to a yet further embodiment of the invention.

It is also envisaged that, in a yet further embodiment, the socket 82 and universal joints 84,86 may be replaced by an externally toothed pulley 88 mounted on the worm gear 48 and a length of flexible toothed belt 90 extending around the pulley 88, as shown schematically in FIG. 11. In such embodiments, the toothed belt 90 may be drawn through the valve opening 78 in the wheel rim 12 to operate the connector 46. Engagement between the teeth 92 formed on the toothed belt 90 and the pulley 88 means that movement of the toothed belt 90 out of the valve opening 78 causes rotation of the pulley 88. This in turn causes rotation of the worm gear 48.

In a yet further embodiment, the universal joints 84,86 may be replaced by a flexible joint which allows drive to be transferred from the socket 82 to the worm gear 48.

The invention claimed is:

1. A wheel unit comprising a wheel rim, a pneumatic tyre receivable on the wheel rim and a runflat assembly adapted to be seated on the wheel rim to close off a well provided in the wheel rim, the runflat assembly including an annular support body which is radially expandable to an expanded condition and contraction means adapted to be operated via an opening formed in the wheel rim, the contraction means, when activated, being operable on the support body to cause the support body to be contracted to a radially contracted condition, the support body, when in its expanded condition, being located within the tyre during fitment of the pneumatic tyre on the wheel rim and, on completion of fitment of the tyre, the contraction means being accessible through the opening to permit operation of the contraction means to cause the support body to be radially contracted to seat the runflat assembly on the wheel rim to close off the well, the support body, when in its contracted condition, having a diameter greater than that of the wheel rim, the contraction means including an annular band which is radially contractible to a contracted condition and operably associated with the support body to cause contraction of the support body on contraction of the annular band, the annular band being split at at least one circumferential location to define opposed ends, and the contraction means further including connector means operably associated with the annular band to adjustably connect the opposed ends together to permit expansion and contraction of the band.

2. A wheel unit as claimed in claim 1 wherein the annular support body is formed from separate circumferentially extending segments held together by the contraction means.

3. A wheel unit as claimed in claim 2 wherein the circumferentially extending segments of the annular support body are formed of a rigid material and house the annular band.

4. A wheel unit as claimed in claim 1 wherein the connector means includes a worm gear which is rotatably mounted on one of the opposed ends of the annular band and engageable with rack teeth provided on the other end of the annular band.

5. A wheel unit as claimed in claim 1 wherein the contraction means further includes an actuator in the form of a shaft having a slot through which the band extends, contraction of the band being effected by rotation of the shaft to cause the band to be wound about the shaft.

6. A wheel unit as claimed in claim 5 wherein the contraction means further includes a ratchet gear mounted on the shaft, the ratchet gear being engageable with a pawl to prevent rotation of the shaft in the direction which causes unwinding of the band.

7. A wheel unit as claimed in claim 6 wherein the contraction means further includes a release lever to release the pawl and permit expansion of the annular band from its contracted condition.

8. A wheel unit as claimed in claim 1 wherein the opening is defined by a valve opening provided in the wheel rim.

9. A wheel unit as claimed in claim 1 wherein the runflat assembly includes a liner attached to the annular support body, the cross-section of the liner corresponding in size and shape to the cross-section of the well provided in the wheel rim.

10. A wheel unit as claimed in claim 1 wherein the annular support body is formed with axially extending formations for engaging the inner sides of the tyre.

11. A wheel unit as claimed in claim 1 wherein the runflat assembly includes an annular support band rotatably mounted on the outer circumference of said annular support body.

12. A wheel unit comprising a wheel rim, a pneumatic tyre receivable on the wheel rim and a runflat assembly adapted to be seated on the wheel rim to close off a well provided in the wheel rim, the runflat assembly including an annular support body which is radially expandable to an expanded condition and contraction means adapted to be operated via an opening formed in the wheel rim, the contraction means, when activated, being operable on the support body to cause the support body to be contracted to a radially contracted condition, the support body, when in its expanded condition, being located within the tyre during fitment of the pneumatic tyre on the wheel rim and, on completion of fitment of the tyre, the contraction means being accessible through the opening to permit operation of the contraction means to cause the support body to be radially contracted to seat the runflat assembly on the wheel rim to close off the well, the support body, when in its contracted condition, having a diameter greater than that of the wheel rim, wherein the runflat assembly includes an annular support band rotatably mounted on the outer circumference of said annular support body, and the runflat assembly includes a series of roller bearings housed between the annular support band and the support body.

13. A method of fitting the pneumatic tyre and the runflat assembly on to the wheel rim of the wheel unit, wherein the wheel unit comprises a wheel rim, a pneumatic tyre receivable on the wheel rim and a runflat assembly adapted to be seated on the wheel rim to close off a well provided in the wheel rim, the runflat assembly including an annular support body which is radially expandable to an expanded condition and contraction means adapted to be operated via an opening formed in the wheel rim, the contraction means, when activated, being operable on the support body to cause the support body to be contracted to a radially contracted condition, the support body, when in its expanded condition, being located within the tyre during fitment of the pneumatic tyre on the wheel rim and, on completion of fitment of the tyre, the contraction means being accessible through the opening to permit operation of the contraction means to cause the support body to be radially contracted to seat the runflat assembly on the wheel rim to close off the well, the support body, when in its contracted condition, having a diameter greater than that of the wheel rim, the contraction means including an annular band which is radially contractible to a contracted condition and operably associated with the support body to cause contraction of the support body on contraction of the annular band, the annular band being split at at least one circumferential location to define opposed ends, and the contraction means further including connector means operably associated with the annular band to adjustably connect the opposed ends together to permit expansion and contraction of the band, and the method including the steps of:
(i) expanding the annular support body and locating the annular support body within the pneumatic tyre;
(ii) fitting the pneumatic tyre with the annular support body located therein on to the wheel rim; and
(iii) contracting the annular support body to seat the runflat assembly on the wheel rim by activating the contracting means via the opening in the wheel rim.

14. A method as claimed in claim 13 wherein step (ii) further includes the sub-steps of:
a) rotating the pneumatic tyre about the wheel rim until the annular support body is oriented in a predetermined rotational position relative to the wheel rim so that the contracting means is aligned with the opening;
b) inflating the pneumatic tyre to cause the beads of the tyre to seat on the wheel rim; and
c) deflating the pneumatic tyre.

* * * * *